United States Patent [19]

Sasaki

[11] Patent Number: 4,577,982
[45] Date of Patent: Mar. 25, 1986

[54] RECORDING APPARATUS

[75] Inventor: Ryoichi Sasaki, Nagoya, Japan

[73] Assignee: Brother Industries, Ltd., Nagoya, Japan

[21] Appl. No.: 713,005

[22] Filed: Mar. 18, 1985

[30] Foreign Application Priority Data

Mar. 26, 1984 [JP] Japan .................................. 59-58586

[51] Int. Cl.⁴ .............................................. B41J 3/04
[52] U.S. Cl. ................................... 400/17; 346/33 R; 346/139 R; 364/520; 400/18; 400/279; 400/322
[58] Field of Search ..................................... 400/17–19, 400/21, 279, 65, 322, 61, 76; 346/33 R, 139 R; 364/520

[56] References Cited

U.S. PATENT DOCUMENTS

| | | | |
|---|---|---|---|
| 4,150,902 | 4/1979 | Brescia | 400/17 |
| 4,252,451 | 2/1981 | Clancy | 400/322 X |
| 4,279,523 | 7/1981 | Ringle | 400/322 X |
| 4,532,521 | 7/1985 | Onoda | 400/17 X |

Primary Examiner—Paul T. Sewell
Attorney, Agent, or Firm—Kane, Dalsimer, Kane, Sullivan and Kurucz

[57] ABSTRACT

A recording apparatus for recording on a recording paper characters and symbols as well as graphs based on pattern data stored in memories by actuating keys of a keyboard section. The recording of a character or symbol is effected by moving a writing instrument relative to the recording paper, and an upright position or a lying position may be selected as a recorded posture of the character or symbol. The recording apparatus includes a writing instrument restoring device which enables the writing instrument to be automatically restored, when the recorded posture is switched from the lying position back to the upright position from which it was previously switched to the lying position, to a position on the recording paper in which the writing instrument was disposed when the recorded posture was previously switched from the upright position to the lying position.

2 Claims, 15 Drawing Figures

PEN ENGAGEMENT
AND DISENGAGEMENT

| FUNCTIONAL KEYS \ RECORDED POSTURE | A | ◁ | ▷ |
|---|---|---|---|
| SPACE KEY | → | ↑ | ↓ |
| BACK SPACE KEY | ← | ↓ | ↑ |
| LINE CHANGE KEY | ← | ⌐↓ | ↑⌐ |

RECORDING APPARATUS

BACKGROUND OF THE INVENTION

This invention relates to a recording apparatus capable of recording various kinds of characters and symbols by moving a recording paper and a writing instrument, such as a ball point pen, relative to each other by actuating a keyboard section.

The applicant has previously developed one type of recording apparatus described hereinabove, comprising (a) a keyboard, provided with various kinds of character keys, symbol keys and a plurality of functional keys, (b) paper feeding device to support the recording paper and feed it either in the normal direction or in the opposite direction, (c) carriage to support writing instrument which is movable in the direction perpendicular to the direction in which the recording paper is fed, (d) carriage drive means to drive the carriage, (e) writing instrument drive means to drive each said writing instrument to bring same into and out of contact with the recording paper, (f) character and symbol pattern memory to store character and symbol pattern data, and (g) control unit operative to read out, as said character and symbol keys are actuated, the character and symbol pattern data corresponding to the actuated character and symbol keys and to control the operation of the paper feeding device, carriage drive means and writing instrument drive means in accordance with the read-out character and symbol pattern data.

In the recording apparatus of the aforesaid construction, it is possible to record characters and symbols on the recording paper by writing same by actuating the keys of the keyboard in the same manner as in an ordinary typewriter. Research conducted subsequent to the construction of this apparatus has revealed that this type of recording apparatus offers the advantage of being able to easily alter the postures in which the characters and symbols are recorded by writing same.

SUMMARY OF THE INVENTION

This invention has been developed to benefit from the advantage offered by the recording apparatus described above. Accordingly, the object of the invention is the provision of a recording apparatus which is capable, not only of recording characters and symbols in an upright position along an imaginary straight line which is perpendicular to the directions in which the recording paper is fed in the same manner as in an ordinary typewriter, but also of recording characters and symbols in a lying position obtained by rotating the characters and symbols 90° from the upright position along an imaginary straight line parallel to the direction in which the recording sheet is fed, and which is further capable, when the characters and symbols are recorded again in the upright position after the recorded posture of the characters and symbols has been previously switched from the upright position to the lying position and recording of characters and symbols has been carried out in the lying position, of automatically restoring the writing instrument to a position on the recording paper in which it was previously located when the posture of the recorded characters and symbols was switched from the upright position to the lying position.

The outstanding characteristics of the invention enabling the aforesaid object to be accomplished include, in a recording apparatus comprising (a) keyboard, (b) paper feeding device, (c) carriage, (d) carriage drive means, (e) writing instrument drive means, (f) character and symbol pattern memory, (g) control unit, (h) recorded posture command key located in the keyboard to give instructions to the recording control unit as to whether the characters and symbols are to be recorded on the recording sheet in an upright position or in a lying position, (i) writing instrument position memory means to store the position in which the writing instrument was located on the recording paper when the recorded posture was switched from the upright position to the lying position by actuating the recorded posture command key, and (j) writing instrument restoring means operative, when the recorded posture is switched from the lying position back to the upright position by actuating the recorded posture command key, to restore the writing instrument to the position on the recording sheet which is stored in the writing instrument position memory means.

By virtue of the aforesaid constituent features, the recording apparatus according to the invention is capable of readily switching the recorded posture of the characters and symbols from the upright position in which the characters and symbols are recorded along an imaginary straight line perpendicular to the direction in which the recording sheet is fed to a lying position in which they are recorded along an imaginary straight line parallel to the direction in which the recording paper is fed, by actuating the recorded posture command key and vice versa. When the characters and symbols are recorded in the upright position after the recorded posture of the characters and symbols was switched previously from the upright position, in which a predetermined amount of recording has been performed, to the lying position, in which a predetermined amount of recording has also been performed, no misalignment occurs between the line of characters and symbols being recorded in the upright position and the line of characters and symbols recorded previously in the upright position. That is, when characters and symbols are recorded in the upright position in the same line that characters and symbols were previously recorded in the upright position, the recording can be effected as if no recording were effected in the lying position and the recording in the upright position were continuously carried out without interruption. When characters and symbols are recorded in the upright position in a line different from the line in which the characters and symbols were recorded in the upright position previously, a line change key may be actuated to enable the recording in the upright position to be effected in a position which is spaced apart from the position in which the previous recording was effected by a distance which is a multiple of an integer of the spacing interval between the lines.

DESCRIPTION OF THE PREFERRED EMBODIMENT

A preferred embodiment of the invention will now be described by referring to the accompanying drawings.

Figure 1:
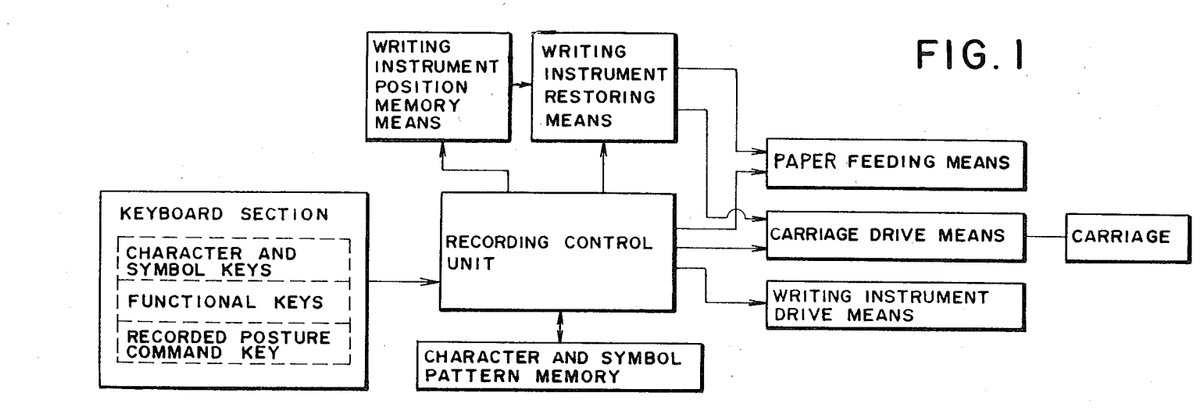
FIG. 1 is a block diagram of the recording apparatus according to the invention, showing its construction.
Figure 2:
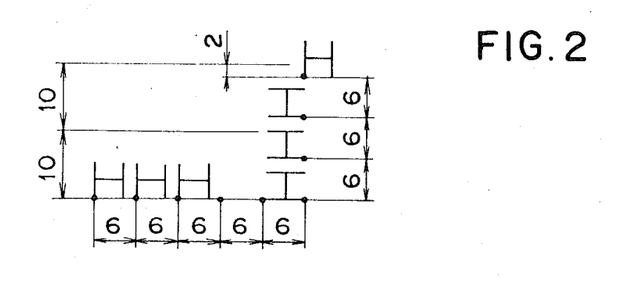
FIG. 2 is a view in explanation of the necessity of the present invention.

FIG. 1 is a block diagram of the recording apparatus according to the invention, and FIG. 2 is a diagram for explaining the necessity of the invention. Before describing in detail the embodiment of the invention, the feature of the invention will be described by referring to FIG. 2. Characters, such as alphabets, are usually greater in height than in width. Thus, it is necessary that the amounts of relative movements of the writing instrument and recording paper in a direction in which characters and symbols are recorded be decided by taking into consideration the width of the characters, and that the amounts of relative movements of the writing instrument and recording paper in a direction which is perpendicular to the direction in which they are recorded be decided by taking into consideration the height of the characters, in order to produce recorded characters and symbols that are attractive. Thus, the spacing interval between the lines on which characters are recorded and the distance covered by the feeding of a character usually differ from each other. Because of this, when the recorded posture of characters is restored to the upright position after the characters have been recorded in the lying position in a predetermined amount following the initial recording in the upright position, it does not necessarily follow that the writing instrument is disposed at the same height as the line on which recording was effected previously in the upright position or spaced apart from the initial line of recording in the upright position by a distance which is a multiple of an integer of the spacing interval between the lines of recording. FIG. 2 shows an example of operation in which the character H is recorded in a plurality of numbers in the upright position, then the writing instrument is moved a distance corresponding to two characters by actuating the space key, the recorded posture is switched to the lying position to record three characters in the lying position, and the recorded posture is switched to the upright position. In this example, if the distance covered by the movement of the writing instrument, as a result of the actuation of the space key, is assumed to be six (6) steps, then the distance between the line on which recording was previously made in the upright position and the line on which recording is made later in the upright position is eighteen (18) steps. Assuming that the lines on which recording is made is spaced from each other by ten (10) steps, the position in which recording is made later in the upright position would be displaced by two (2) steps from the position in which recording was previously made in the upright position.

To obviate the aforesaid problem of the prior art, the recording apparatus according to the invention provides the constituent feature that, when the recorded posture is switched from the lying position to the upright position after recording has previously been carried out in the upright position and the recorded position was switched from the upright position to the lying position, the writing instrument is automatically returned to the position in which it was disposed when the recorded posture was switched previously from the upright position to the lying position. Therefore, if the position in which recording is carried out in the upright position is decided by, using as a reference, the position to which the writing instrument is returned, then the problem that recording might otherwise be effected in the upright position in a position displaced from the position in which recording should be effected can be obviated.

Figure 3:
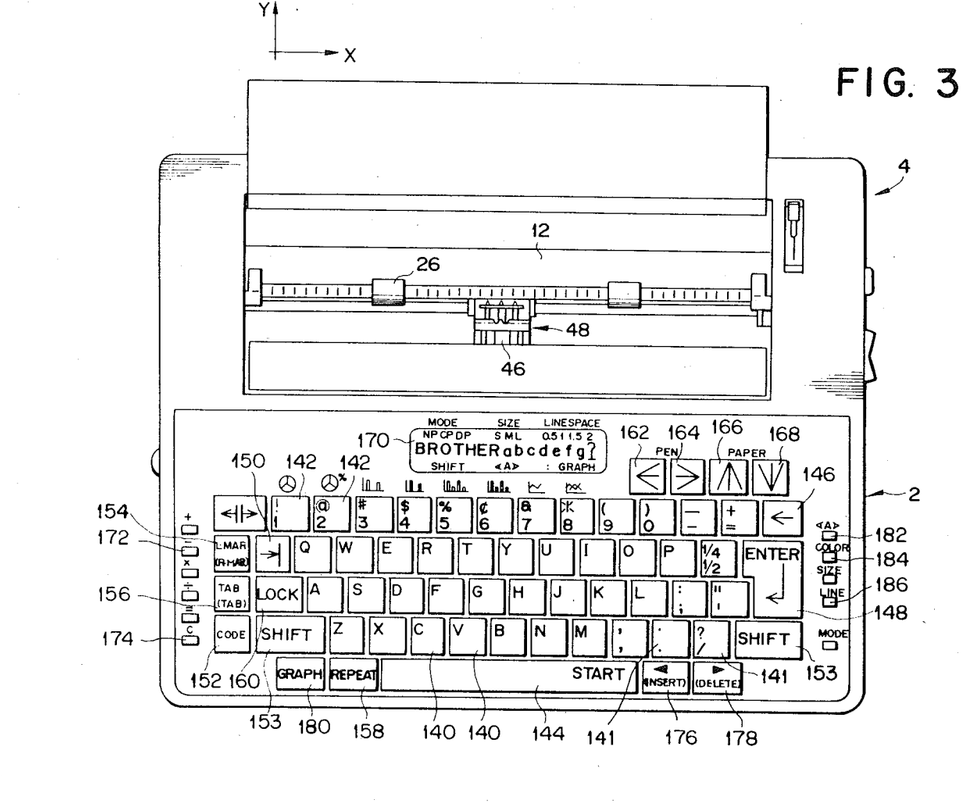
FIG. 3 is a plan view of the ball point pen type recording apparatus incorporating therein one embodiment of the recording apparatus in conformity with the invention.

Turning to the preferred embodiment of the invention, FIG. 3 shows in a plan view the ball point pen type recording apparatus incorporating therein one embodiment of the recording apparatus according to the invention, comprising a keyboard section 2 located in the forward part of the recording apparatus, and a recording section 4 in the rearward part thereof.

Figure 4:
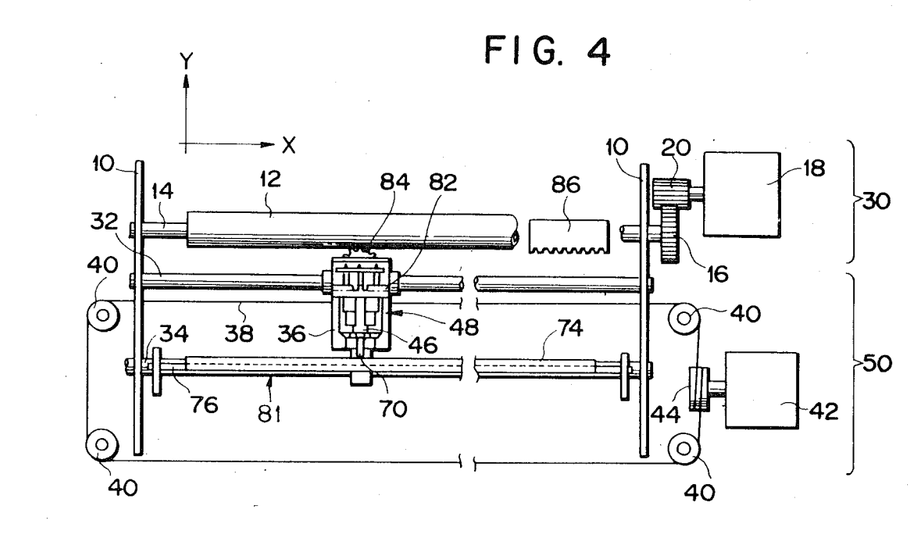
FIG. 4 shows in a plan view the mechanical section of the keyboard section of the recording apparatus shown in FIG. 3, shown as a model.

FIG. 4 shows as a model the mechanical section of the recording section 4. As shown, side frames 10 forming a pair are located on opposite sides of the recording apparatus and constitute part of a main frame. Located between the side frames 10 is a platen 12 of substantially columnar configuration which is rotatably supported by a shaft 14 connected to the side frames 10. A gear 16 secured to one end of the shaft 14 meshes with a pinion 20 secured to an output shaft of a platen drive motor 18, so that the platen 12 can be rotated through any angle as desired in either the usual direction or the opposite direction.

Figure 5:
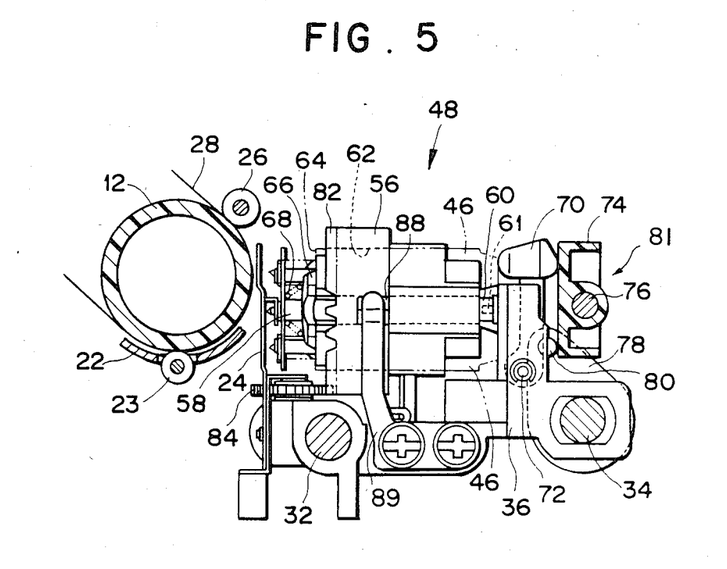
FIG. 5 is a sectional side view showing, on an enlarged scale, the pen head and its vicinity in the recording apparatus shown in FIG. 3.

As shown in FIG. 5, the platen 12 cooperates with a paper pan 22, a keep roller 23, a paper guide 24 and a paper bail 26 to hold a recording paper 28 in a curved position along an outer periphery of the platen 12 and also to impart movement to the recording paper 28. The platen 12, gear 16, platen drive motor 18, pinion 20, paper pan 22, keep roller 23, paper guide 24 and paper bail 26 constitute sheet feeding means 30 which holds the recording paper 28 and moves same peripherally of the platen 12 or in a Y-axis direction.

Located parallel to the platen 12 are two guide rods 32 and 34 which are connected at opposite ends to the two side frames 10 to support a carriage 36 for sliding movement thereon. Connected to the carriage 36 at opposite ends is a wire 38 is stretched over four guide rollers 40 and a pulley 44 secured to an output shaft of a carriage drive motor 42. Thus, when the carriage drive motor 42 is rotated through an arbitrarily selected angle in either the usual direction or the opposite direction, the carriage 36 can be moved axially of the platen 12 or in an X-axis direction a randomly selected distance. The wire 38, guide rollers 40, carriage drive motor 42 and pulley 44 constitute carriage drive means 45.

The carriage 36 supports thereon a pen head 48 containing ball point pens 46 serving as writing instruments, so that the ball point pens 46 move in the X-axis direction as the carriage 36 moves axially of the platen 12. By a combination of the movement in the X-axis direction imparted to the ball point pens 46 with the movement in the Y-axis direction of the recording sheet 28 imparted by the sheet feeding means 30, the ball point pens 46 can be moved in any direction as desired on the surface of the recording sheet 28 to record characters, symbols, etc.

FIG. 5 shows the construction of the pen head 48 including a pen holder 56 serving as a main body which is supported by the carriage 36 for rotation about an axis which is perpendicular to the axis of the platen 12. More specifically, a stub shaft 58 projecting from an end face of the pen holder 56 facing the platen 12 is rotatably supported by the paper guide 24, and a boss 60 located at the opposite end of the pen holder 56 receives in an opening formed therein a support projection 61 extending from the carriage 36, so that the pen holder 56 is supported for rotation by the carriage 36. The pen holder 56 is formed with four pen inserting holes 62 located equidistantly on the circumference of a circle centered at the axis of rotation of the pen holder 56 each for receiving one ball point pen 46 of a different color for sliding movement. Thus, the pen holder 56 contains four ball point pens 46 of different colors. Each ball point pen 46 has a forward end portion with a smaller diameter than the rest of the pen to provide a shoulder 64, and a common return plate 66 is mounted on the shoulders 64 of the pens 46 to transmit the biasing force of a return spring 58 to the pens 46.

Meanwhile, a hammer 70 pivotally supported by the carriage 36 through a pin 72 is located behind the pen holder 56. Located behind the hammer 70 is a hammer drive plate 73 supported for rotation about a support shaft 76. As a lever 78 supported by the guide rod 34 is pivotally moved clockwise in FIG. 5 about the guide rod 34 by a solenoid, not shown, a pin 80 secured to the lever 78 moves the hammer drive plate 74 counterclockwise, to thereby pivotally move the hammer 70 in the same direction. As a result, the hammer 70 causes one of the ball point pens 46 to move forwardly against the biasing force of the return spring 68 until the forward end or tip of the pen 46 is brought into contact with the surface of the recording paper 28. At this time, the return plate 66 is tilted a predetermined angle to allow the pen 46 to move forwardly. The hammer 70, hammer drive plate 74, support shaft 76, lever 78 and solenoid, not shown, cooperate with the return plate 66 and return spring 68 to constitute writing instrument drive means 81 for bringing the ball point pen 46 serving as a writing instrument into and out of contact with the surface of the recording paper 28.

As described above, the pen holder 56 supports four ball point pens 46. Of the four ball point pens 46 supported by the pen holder 56, the ball point pen 46 which is disposed in the uppermost portion is positioned against the outer peripheral surface of the platen 12 substantially at a right angle and moved forwardly by the hammer 70. That is, the ball point pen 46 disposed on the uppermost portion of the pen holder 56 is disposed in a writing position. Any one of the four ball point pens 46 as desired may be disposed in the writing position as the pen holder 56 is rotated. A gear 82 is formed on the end face of the pen holder 56 facing the platen 12 and meshes with a pinion 84 supported by the carriage 36 for rotation about a vertical axis. Thus, as the carriage 36 moves to the right end in FIG. 4, the pinion 84 is brought into meshing engagement with a rack 86 and rotated thereby, so that the pen holder 56 is caused to make a one-quarter revolution or rotated 90°. The rack 86 is moved by a mechanism, not shown, between a position in which it is brought into meshing engagement with the pinion 84 and a position in which it is brought out of meshing engagement therewith, so that the rack 86 meshes with the pinion 84 when the carriage 36 moves in one direction and brought out of meshing engagement therewith when it moves in the opposite direction. Thus, each time the carriage 36 is caused by the rack 86 to make one reciprocatory movement, the pen holder 56 is caused to make a one-quarter resolution to successively bring ball point pens 46 of different colors to the writing position. Four V-shaped notches 88 are formed on an outer peripheral surface of the pen holder 56 and located equidistantly from each other. As the forward end of a positioning spring 89 secured to the carriage 36 is engaged in one of the V-shaped notches 88, the position in which the pen holder 56 stops after rotating is strictly regulated. In this embodiment, the pen holder 56, gear 82, pinion 84, rack 86 and positioning spring 89 constitute pen selection means for bringing any one of the four ball point pens 46 as desired to the writing position.

Figure 6:
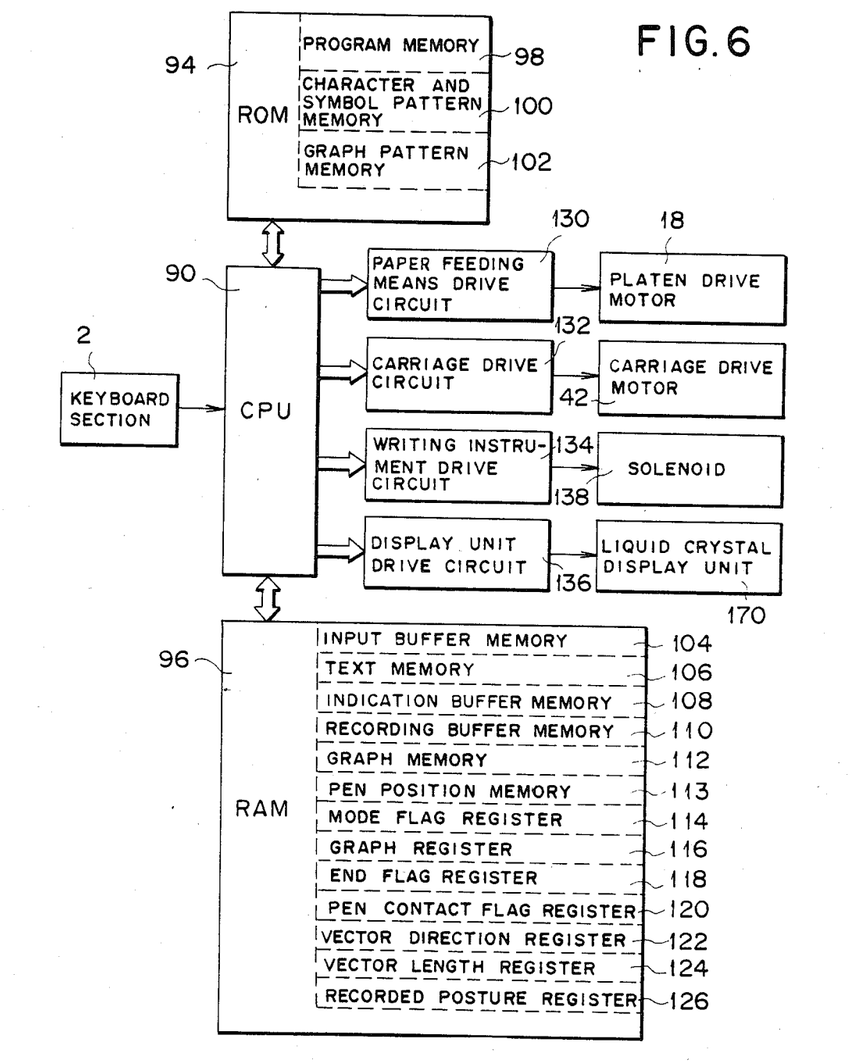
FIG. 6 is a block diagram of the electric control circuit of the recording apparatus shown in FIG. 3.

FIG. 6 shows a recording control unit for controlling the operation of the recording section 4 of the aforesaid construction. The recording control unit comprises a central processing unit (CPU) 90 to which the keyboard section 2 is connected as an input device. A read-only memory (ROM) 94 and a random access memory (RAM) 96 are also connected to the CPU 90. The ROM 94 includes a program memory 98 for storing programs represented by the flow charts shown in FIGS. 10–12, and a program for controlling the operation of the recording apparatus as a whole, a character and symbol pattern memory 100 for storing pattern data corresponding to the characters and symbols that can be inputted by actuating keys of the keyboard section 2, and a graph pattern memory 102 for storing pattern data corresponding to the graphs that can be inputted by actuating the keys of the keyboard section 2.

Figure 7:
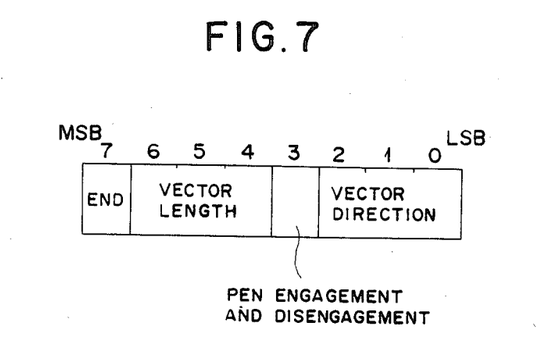
FIG. 7 is a view showing data allotted to one unit of the character and symbol pattern memory disposed in the random access memory of the control unit shown in FIG. 6.
Figure 8:
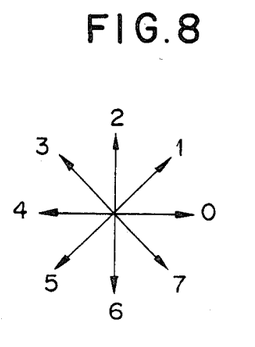
FIG. 8 is a view in explanation of the directions of vectors represented by the vector direction data stored in the vector direction register shown in FIG. 6.

Referring to FIG. 7, one unit of character and symbol pattern data is composed of eight (8) bits. Three digit positions at the bottom are allotted to vector direction data representing the directions of vectors corresponding to lines constituting parts of a character or symbol. A digit position next to these three digit positions is allotted to pen engagement and disengagement data showing whether the ball point pen 46 is in or out of contact with the recording sheet 28. Three digit positions next to this digit position are allocated to vector length data representing the lengths of vectors, and the uppermost digit position is allotted to end data showing whether data for one character has ended or not. With regard to the directions of vectors, eight (8) directions shown in FIG. 8 are used. With regard to the length of vectors, zero (0) to seven (7) steps are used, as clearly shown in FIG. 9. Pattern data for one character or symbol are represented by a plurality of bytes, each of which is composed of a set of binary digits as described hereinabove and serving as a unit. One example of pattern data of character "A" is shown in Table 1.

TABLE 1

| Data No. | End MSB 7 | Vector Length 6 | Vector Length 5 | Vector Length 4 | Pen Engagement and Disengagement 3 | Vector Direction 2 | Vector Direction 1 | Vector Direction LSB 0 |
|---|---|---|---|---|---|---|---|---|
| 1 | 0 | 1 | 0 | 0 | 1 | 0 | 1 | 0 |
| 2 | 0 | 0 | 1 | 0 | 1 | 0 | 0 | 1 |
| 3 | 0 | 0 | 1 | 0 | 1 | 1 | 1 | 1 |
| 4 | 0 | 1 | 0 | 0 | 1 | 1 | 1 | 0 |
| 5 | 0 | 0 | 1 | 0 | 1 | 0 | 1 | 0 |
| 6 | 0 | 1 | 0 | 0 | 1 | 1 | 0 | 0 |
| 7 | 0 | 0 | 1 | 0 | 0 | 1 | 1 | 1 |
| 8 | 1 | 1 | 0 | 0 | 0 | 0 | 0 | 0 |

In the pattern data shown in Table 1, it will be seen that one (1) byte is not used for data showing the completion of the data corresponding to one character or symbol and that such data are stored together with data showing the last vector of one character or symbol and data showing whether the pen is in or out of engagement with the recording sheet.

In the graph pattern memory 102, data representing the basic patterns of various graphs, such as a pie chart, a linear graph, a bar graph, etc., are stored. These basic pattern data are similar to those which have been used in known graph drawing apparatus of the prior art, so that their detailed description shall be omitted. However, in the embodiment of the invention shown and described above, each graph can show up to twelve (12) numerical data.

Meanwhile, the RAM 96 includes an input buffer memory 104 for temporarily storing code data inputted from the keyboard section 2, a text memory 106 for storing code data inputted by actuating a key, an indication buffer memory 108 for storing code data for characters and symbols to be indicated by a liquid crystal display unit 170 subsequently to be described, a recording buffer memory 110 for temporarily storing code data corresponding to characters and symbols to be recorded by the recording section 4, a graph memory 112 for storing numerical value data to be combined with the graph pattern data stored in the graph pattern memory 102 to draw any graph as desired, and a pen position memory 113 serving as a pen position memory means. In addition to the various memories described hereinabove, the RAM 96 further include a mode flag register 114 for setting a graphic mode flag, a graph register 116 for setting a flag indicating the type of graph to be drawn, an end flag register 118 for recording characters and symbols, a pen engagement flag register 120, a vector direction register 122, a vector length register 124, and a recorded posture register 126 for setting data for indicating the postures in which characters and symbols are to be recorded.

The CPU 90 is connected to a sheet feeding means drive circuit 130, a carriage drive circuit 132, a writing instrument drive circuit 134 and a display unit drive circuit 136 to which the platen drive motor 18, the carriage drive motor 42, a solenoid 138 and a liquid crystal display unit 170, respectively, are connected. The solenoid 138 is a monostable latching solenoid constituting a part of the writing instrument drive means 81.

From the foregoing description, it will be evident that in this embodiment the CPU 90, ROM 94, RAM 96, paper feeding device drive circuit 130, carriage drive circuit 132 and writing instrument drive circuit 134 constitute the recording control unit.

The keyboard section 2 will not be described by referring to FIG. 3. Like the keyboard section of an ordinary typewriter, the keyboard section 2 includes character and symbol keys and functional keys. The character and symbol keys include a multiplicity of alphabet keys 140, symbol keys 141 and digit keys 142, and the functional keys include a space key 144, back space key 146, return key 148, tab key 150, code key 152, shift key 153, margin setting key 154, tab setting key 156, repeat key 158 and shift lock key 160. The numerals 162 and 164 designate pen shift keys for shifting the ball point pen 46 leftwardly and rightwardly, respectively, and the numerals 166 and 168 designate paper feeding keys for shifting upwardly and downwardly, respectively, the recording paper 28 supported by the platen 12.

The liquid crystal display unit 170 noted hereinabove has fifteen (15) digit positions and is disposed in the upper portion of the keyboard section 2 to indicate data inputted by actuating the keys described hereinabove while successively shifting the inputted data leftwardly. The keyboard section 2 also includes arithmetic operation keys 172 and a clear key 174 located in a left end portion thereof to input addition, subtraction, multiplication, division and equal symbols. The liquid crystal display unit 170 is also operative to indicate equations for doing calculation and the results of the calculation done by actuating the digit keys 142 together with the arithmetic operation keys 172 and clear key 174. The data inputted by actuating the keys can be corrected by actuating an insert key 176 and a delete key 178 so long as the data are being indicated by the liquid crystal display unit 170. The insert key 176 and delete key 178 are essentially symbol keys and only function as insert and delete keys respectively so long as they are actuated together with the code key 152.

A graph key 180 serves as a mode selection operating key for switching the recording apparatus between a typing mode in which it functions as an ordinary typewriter and a graphic mode in which it performs the function of drawing a graph. When the recording apparatus is switched to the graphic mode, indication is made in the liquid crystal display unit 170 as to what type of graph is to be drawn. By actuating one of the digit keys 142 corresponding to the desired graph, it is possible to select either a pie chart, a bar graph, a linear graph, etc.

The keyboard section 2 also includes a vector key 182, a color selection key 184 and a line key 186 located in a right end portion thereof. The vector key 182 serves as a recorded posture command key for selecting one of an upright position recording mode in which characters and symbols are recorded from left to right on the recording paper 28 while they remain in an upright position, and a lying position recording mode in which the characters and symbols are recorded vertically upwardly from below or downwardly from above on the recording paper 28 while they remain in a lying position in which they are turned leftwardly or rightwardly from the upright position. The color selected key 184 is actuated to select a desired color of ink in the ball point pen 46 used. The line key 186 is actuated to alter stepwise the amount in which the recording paper 28 is fed when the return key is actuated.

Operation of the recording apparatus of the aforesaid construction will be described by referring to the flow charts in FIGS. 10-12.

Figure 10:
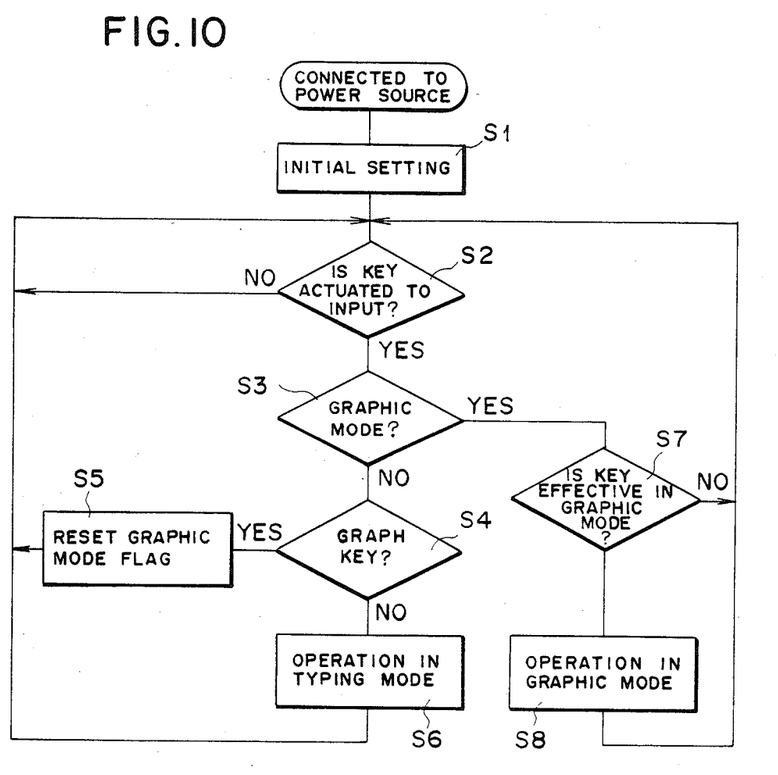
FIGS. 10, 11 and 12 are flow charts of the operation of the control program stored in the read-only memory of the control circuit shown in FIG. 6.
Figure 11:
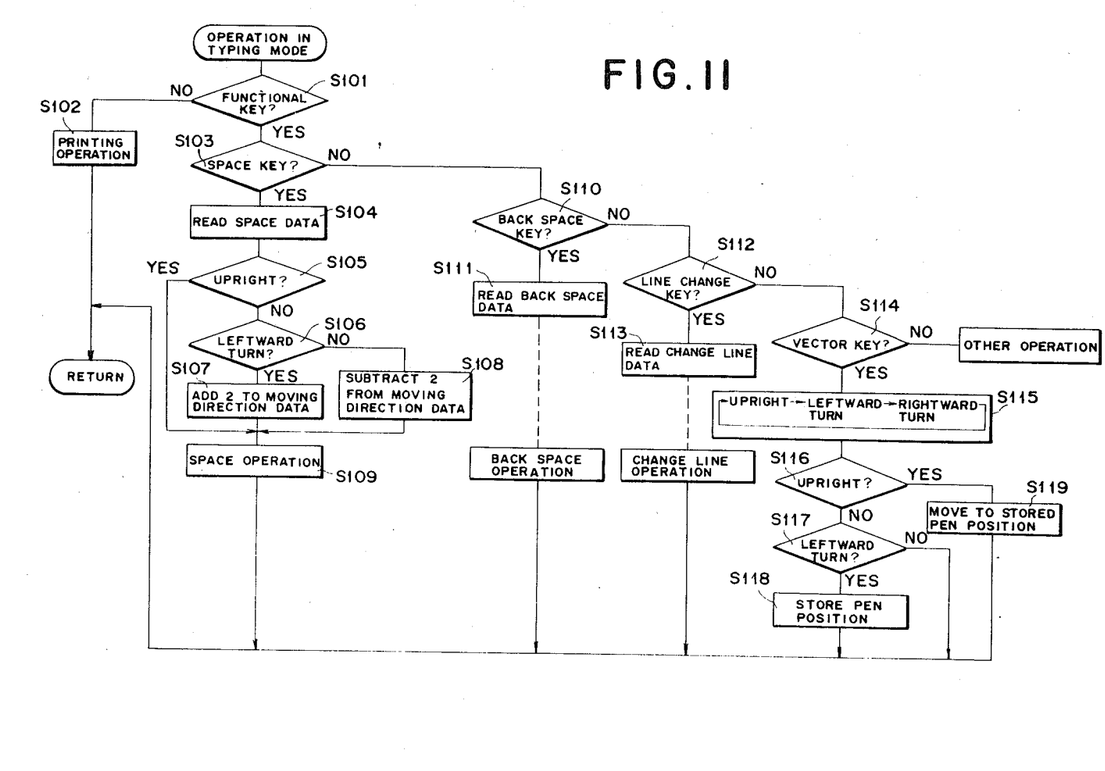

Referring to FIG. 10, the operation is initially set at step S1 as the main key is actuated to electrically connect the recording apparatus to the power source. Thsat is, each register and counter are reset, and the carriage 36 is moved to a left margin position after being restored to its original position, as is the case of an ordinary typewriter. At the same time, the mode flag register 114 is reset, thereby automatically bringing the recording apparatus to the typing mode. Thereafter, step S2 is repeated to bring the recording apparatus to a standby condition in which it is ready to have data inputted by actuating the keys. After data are inputted by actuating the key, the operation shifts to step S3 in which a determination is made as to whether or not the recording apparatus is in the graphic mode. Since the recording apparatus is in the typing mode as described hereinabove, the operation shifts to step S4 in which a determination is made as to whether the inputted code data are those which correspond to the graph key 180. If the key actuated was the graph key 180, then the operation shifts to step S5 in which the content of the mode flag register 114 is altered (in this case, a graph mode flag is set at the mode flag register 114), and the liquid crystal display unit 170 poses a query as to what kind of graph is desired. Then, the operation returns to step S2. However, if the key actuated was not the graph key 180, the operation shifts to step S6 in which the program is carried out in the typing mode. This operation performed in the typing mode is subsequently to be described in detail.

If any key is actuated to input data in step S5 after the graph mode flag is set, then the result of the judgment passed in step S3 becomes YES, and it is determined in step S7 as to whether the actuated key is one which is effective in the graph mode. That is, since it is impossible to record alphabets or other characters and symbols when the recording apparatus is in the graphic mode, the operation automatically returns to step S2 if the actuated key is for inputting a character or symbol. In this case, an alarm may be sounded or indication of an error may be given by the liquid crystal display unit 170. If the determination in step S7 is YES, then the program is carried out in the graph mode in step S8. More specifically, a graph is selected by actuating one of the digit keys 142 in answer to the query as to the type of the graph to be drawn, and at the same time numerical value data to be represented by the graph are inputted up to a maximum of twelve (12) by actuating the digit keys 142 while pattern data corresponding to the selected graph are read out, to thereby control the paper feeding means drive circuit 130, carriage drive circuit 132 and writing instrument drive circuit 134 based on the numerical value data inputted by actuating the keys to draw the graph on the recording paper 28.

Operations performed in the typing mode will be described by referring to FIGS. 11 and 12. Referring to FIG. 11, it is determined in step S101 whether the key actuated to input code data is one of the functional keys or the space key 144, back space key 146 or return key 148. If the determination is NO, then the operation shifts to step 102 in which a typing operation is performed to record one character or symbol. Since the recorded posture flag register 126 has been set initially in step S1 as described hereinabove, the recording of the character or symbol is effected in an upright position unless the vector key 182 is actuated.

Figure 12:
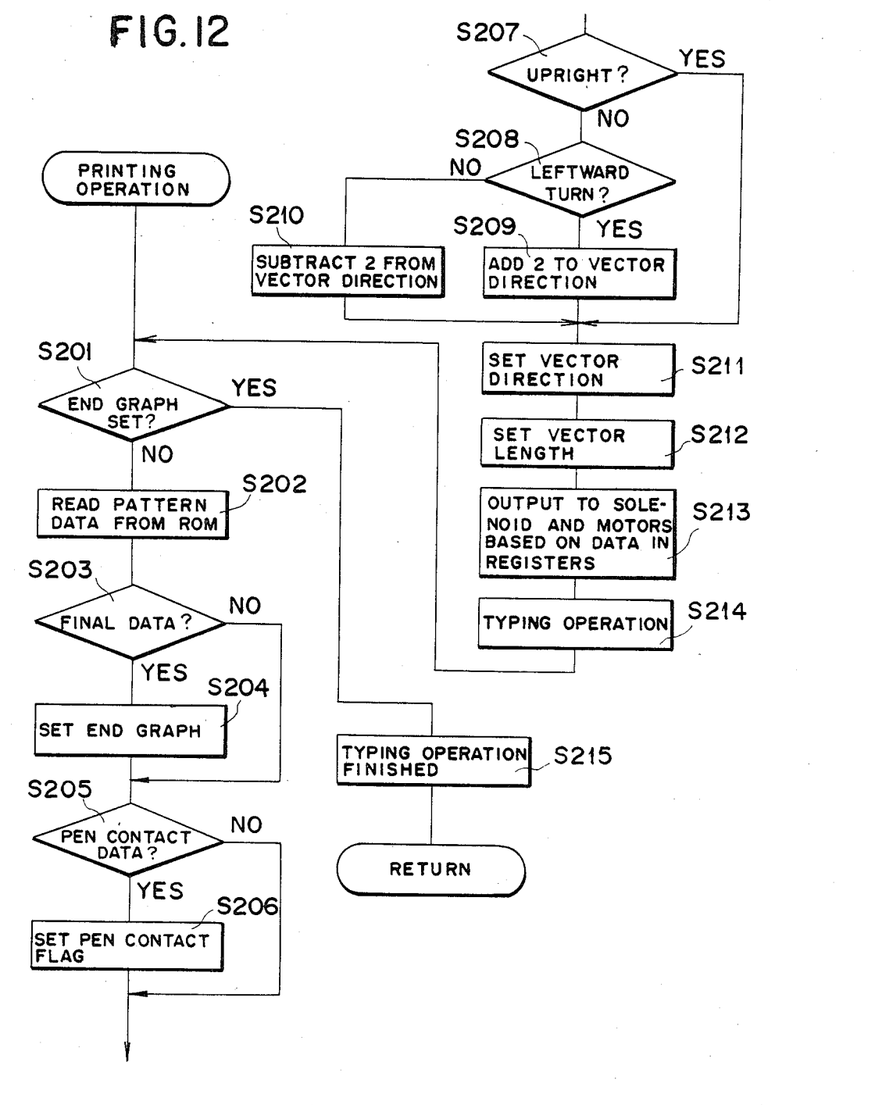

The recording of the character or symbol is effected in accordance with a typing subroutine shown in FIG. 12. First of all, it is determined in step S201 whether an end flag has been set or whether the contact of the end flag register 118 has been made (1). Since the end flag has not yet been set at this stage, the determination made is NO, and the operation shifts to step S202 in which the first set of data of pattern data corresponding to the data inputted by actuating the key are read from the ROM 94 by the CPU 90, and it is determined in step 203 whether the data read from the ROM 94 are the final data of the pattern data of the character or symbol. Since they are not the final set of data, the determination made is NO, and the operation shifts to step S205.

Figure 9:
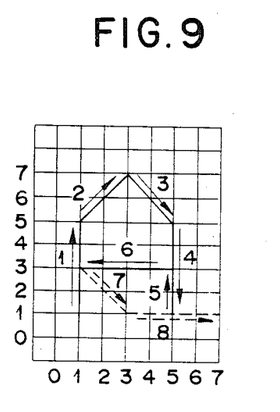
FIG. 9 is a view in explanation of one example of characters that can be recorded by the recording apparatus shown in FIG. 3.

In step S205, it is determined whether the pen engagement and disengagement data of the read-out data which represent whether the ball point pen 46 is in contact with the recording paper 28 or out of contact therewith indicate that the ball point pen 46 is in engagement or contact with the recording paper 28. If the determination made in YES, then the content of the pen engagement flag register 120 is made (1) in step S206 and the pen engagement flag is set. If it is NO, then the operation shifts to step S207 by bypassing step S206. In step S207, it is determined whether the content of the recorded posture register 126 indicates an upright position. If the upright position is indicated, then the operation shifts to step S211 and step S212, by bypassing steps S208–S210, to set in the vector direction register 122 and vector length register 124 vector direction data and vector length data, respectively, of the read-out data. For example, if the data read from the ROM 94 in step S202 are those of No. 1 data shown in Table 1, then a line in the direction of the arrow 1 in FIG. 9 is drawn. Therefore, data corresponding to No. 2 data to No. 8 data shown in Table 1 are successively read out to record the character "A" shown in FIG. 9. As No. 8 data are read out, the determination made in step S203 becomes YES and the end flag is set in step S204. This makes the determination made in step S201 YES, so that the operation shifts to step S215, thereby terminating the operation of recording the character "A".

If the actuation of the vector key 182 causes the content of the recorded posture register 126 to indicate a lying position obtained by turning the upright position leftwardly or rightwardly, then the determination made in step S207 is NO and the operation shifts to step S208. That is, it is determined whether recording is done in a leftwardly lying position or a rightwardly lying position. If the content of the recorded posture register 126 indicates the leftwardly lying position, then the operation shifts to step S209 in which (2) is added to the vector direction data of the data read out in step S202.

TABLE 2

| Data No. | End MSB 7 | Vector Length | | Pen Engagement and Disengagement | Vector Direction | | LSB |
|---|---|---|---|---|---|---|---|
| | | 6 | 5 | 4 | 3 | 2 | 1 | 0 |
| 1 | 0 | 1 | 0 | 0 | 1 | 1 | 0 | 0 |
| 2 | 0 | 0 | 1 | 0 | 1 | 0 | 1 | 1 |
| 3 | 0 | 0 | 1 | 0 | 1 | 0 | 0 | 1 |
| 4 | 0 | 1 | 0 | 0 | 1 | 0 | 0 | 0 |
| 5 | 0 | 0 | 1 | 0 | 1 | 1 | 0 | 0 |
| 6 | 0 | 1 | 0 | 0 | 1 | 1 | 1 | 0 |
| 7 | 0 | 0 | 1 | 0 | 0 | 0 | 0 | 1 |
| 8 | 1 | 1 | 0 | 0 | 0 | 0 | 1 | 0 |

Figure 13:
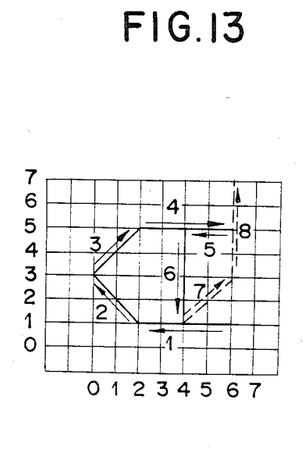
FIGS. 13 and 14 are views in explanation of the manner in which the character shown in FIG. 9 is turned leftwardly and rightwardly respectively.

More specifically, the vector direction data of No. 1 data shown in Table 1 are changed to the vector direction data of No. 1 data shown in Table 2. Thus, the data indicating that a line should be drawn upwardly in the direction of the arrow 1 in FIG. 9 are changed to data indicating that a line should be drawn from right to left in the direction of the arrow 1 in FIG. 13. Thereafter, operations are performed in like manner from step S211 to Step S214, to draw a line in the direction of the arrow 1. Likewise, as No. 2 data and the following data shown in Table 1 are read out, the vector direction data are changed as shown in Table 2, until the character "A" in the leftwardly lying position as shown in FIG. 13 is recorded.

If the determination made in step S208 is NO or the content of the recorded posture register 126 indicates that recording should be done in a rightwardly lying position, then (2) is deducted from the vector direction data of the data read out in step S210.

TABLE 3

| Data No. | End MSB 7 | Vector Length | | Pen Engagement and Disengagement 3 | Vector Direction | | LSB 0 |
|---|---|---|---|---|---|---|---|
| | | 6 | 5 | 4 | | 2 | 1 |
| 1 | 0 | 1 | 0 | 0 | 1 | 0 | 0 | 0 |
| 2 | 0 | 0 | 1 | 0 | 1 | 1 | 1 | 1 |
| 3 | 0 | 0 | 1 | 0 | 1 | 1 | 0 | 1 |
| 4 | 0 | 1 | 0 | 0 | 1 | 1 | 0 | 0 |
| 5 | 0 | 0 | 1 | 0 | 1 | 0 | 0 | 0 |
| 6 | 0 | 1 | 0 | 0 | 1 | 0 | 1 | 0 |
| 7 | 0 | 0 | 1 | 0 | 0 | 1 | 0 | 1 |
| 8 | 1 | 1 | 0 | 0 | 0 | 1 | 1 | 0 |

Figure 14:
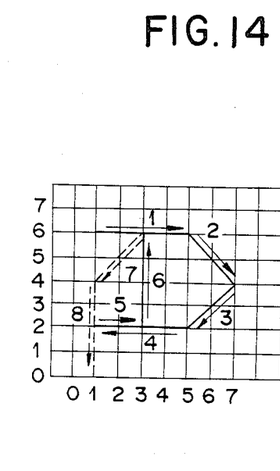

That is, the data shown in Table 1 are changed to the data shown in Table 3. In this way, the data indicating that the line should be drawn in the direction of the arrow 1 vertically upwardly from below in FIG. 9, for example, are changed to data indicating that a line should be drawn from left to right in the direction of the arrow 1 in FIG. 14, and a character "A" is drawn in a rightwardly lying position as shown in FIG. 13.

Figure 15:
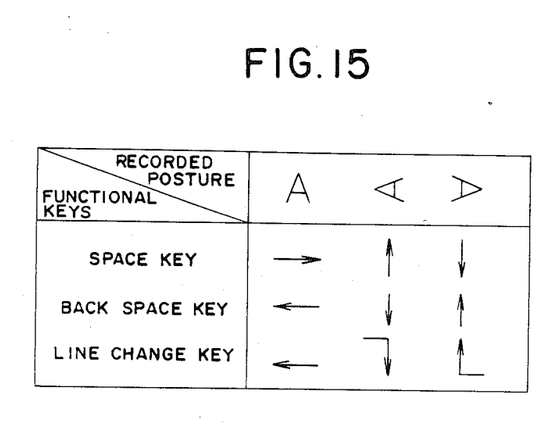
FIG. 15 shows the recorded postures of a character in relation to the functional keys.

The character or symbol is recorded in an upright position or in a lying position as described hereinabove. As the character or symbol is recorded, the function of the space key 144, back space key 146 and return key 148 is automatically altered to the one which matches the recorded posture of the character or symbol, as shown in FIG. 15, as described hereinafter in detail. If the determination made in step S101 shown in FIG. 11 is YES, then the operation shifts to step S103 in which it is determined whether the functional key is the space key 144. If the determination made is YES, then the operation shifts to step S104 in which space data or data about the amount of movement of the ball point pen 46 and data about the direction of movement thereof with respect to one space are read out. Then, in step S105, it is determined whether the content of the recorded posture register 126 indicates that the character or symbol should be recorded in an upright position. If the determination passed is YES, then the operation shifts to step S109 without steps S106 to S108 being carried out, to move the ball point pen 46 relative to the recording paper 28 for the amount and in the direction that have been read out.

However, if the determination made in step S105 is NO, then the operation shifts to step S106 in which it is determined whether the content of the recorded posture register 126 indicates that the character or symbol should be recorded in the leftwardly lying position. If the determination is YES, then the operation shifts to stop S107 in which two (2) is added to the data about the direcion of movement in the space data (which is expressed in the eight digit system shown in FIG. 8) to alter the direction of movement leftwardly by 90°, before the operation on the space is performed in step S109. However, if the determination in step S106 is NO, this means that the character or symbol should be recorded in the rightwardly lying position. Thus, in step S108, two (2) is deducted from the data about the direction of movement in the space data, before the operation on the space is performed in step S109, so that the ball point pen 46 is moved vertically downwardly along the recording paper 28 a distance corresponding to one space.

The operation performed when the actuated functional key is the space key 144 has been described above in detail. When the actuated functional key is the back space key 146 or return key 148, the determination made in step S103 becomes NO, and the operation shifts to step S110. Depending on the determination made in step S110, back space data are read out in step S111 or return data are read out in step S113. Thereafter, operations similar to the operations performed in steps S105 to S108 with regard to the space key 144 are performed, although not shown, so that back space or line change will be effected. That is, the data about the direction of movement in the back space data or line change data is altered to conform to the recorded posture of the character or symbol.

Thus, even if the character or symbol is recorded in the leftwardly lying position or rightwardly lying position, the operator is able to operate the space key 144, back space key 146 and return key 148 in the same sense as if the recording were being performed in the upstanding position. No difficulties are experienced in recording a character or symbol in an upright position on the recording paper 28 along an imaginary straight line which is perpendicular to the direction in which the recording paper 28 is fed or in recording a character or symbol in a lying position on the recording paper 28 along an imaginary line which is parallel to the direction in which the recording paper 28 is fed.

According to the invention, when the recorded posture of a character or symbol is switched back to the upstanding position from the lying position in which recording of characters and symbols have been carried out either in a rightwardly lying position or in a leftwardly lying position to which the recorded posture was previously lying position to which the recorded posture was previously switched from the upright position in which the recording was originally performed, the ball point pen can be automatically returned to the position in which it was located when the recorded posture was switched for the first time from the upright position to the lying position. This constituent feature of the invention will be described in detail. If the determination made in step S112 described hereinabove is NO, then the operation shifts to step S114 in which it is determined whether the actuated key is a vector key. If the determination is NO, then an operation related to the actuated key is performed. However, if the determination is YES, then the operation shifts to step S115 in which the content of the posture register 126 is altered in a predetermined order. More specifically, the recorded posture of the character or symbol is altered from the upright position to the leftwardly lying position, from he leftwardly lying position to the rightwardly lying position, and from the rightwardly lying position back to the upstanding position in the indicated order. The content of the recorded posture register 126 is set at the upright position when the initial setting is carried out in step S1. Therefore, when the vector key 182 is initially actuated, the content of the recorded posture register 126 is altered from the upright position to the leftwardly lying position. As a result, the determination in step S116 is NO and the determination in step S117 is YES, so that the position in which the ball point pen 46 is located at that time is stored. That is, the positions of the carriage 36 and the recording paper 28 are stored in the pen position memory 113.

When the character or symbol is recorded in the leftwardly lying position, the character or symbol key is immediately actuated. However, when the recorded position selected is the rightwardly lying position, the vector key 182 is actuated again, to alter the content of the recorded posture register 126 from the leftwardly lying position to the rightwardly lying position before steps S116 and S117 are carried out. In this case, however, the determination in step S117 is NO, so that step S118 is not carried out. Thus, the operation returns to the main program for recording the character or symbol in the rightwardly lying position by actuating the respective character and symbol key.

When the recorded posture returns to the upright position after the recording is carried out in the leftwardly lying position or rightwardly lying position as described hereinabove, the vector key 182 is manipulated once or twice. As a result, the content of the recorded posture register 126 is altered in step S115 of indicate that the recording should be performed in the upright position. Then, in step 116, it is determined whether the recorded posture is the upright position. Since the determination made determination made is YES, the operation shifts to step S119 in which the paper feeding means 30 and carriage drive means 45 are actuated through the paper feeding means drive circuit 130 and carriage drive circuit 132, so as to move the ball point pen 46 to the pen position stored in the pen position memory 113 in step S118. This automatically brings the ball point pen 46 to the position on the recording paper 28 in which it was located when the recorded posture was switched previously from the upstanding position to the leftwardly lying position or rightwardly lying position, thereby making it possible for the operator to continue the operation of recording the character or symbol in the upright position where it was interrupted, by actuating the character and symbol key. It is also possible for the operator to actuate the line change key 148, pen shift keys 162 and 164 and paper feeding keys 166 and 168 to move the ball point pen 46 to any position as desired before actuating the character and symbol key, to record the character on a line which is spaced apart from the line on which recording was previously performed in the upright position by a distance which is a multiple of an integer of the spacing interval between the lines of recording.

In the embodiment shown and described above in detail, the ball point pen 46 is automatically restored to its original position by using the upright position of the character or symbol as a regular position when the recorded posture of the character or symbol is restored to the upright position from the leftwardly lying position or rightwardly lying position to which it was previously switched from the upright position. However, the invention is not limited to this specific form of embodiment, and the ball point pen can be restored to its original position even if the leftwardly lying position or rightwardly lying position were used as the standard position. For example, when the recorded posture is restored to the leftwardly lying position from the upright position or rightwardly lying position to which it was previously switched from the leftwardly lying position, the ball point pen can be automatically returned to the final position in which recording was performed in the leftwardly lying position. It is also possible to automatically return the ball point pen to the position in which it was located before the recorded posture was switched from all the recorded postures including the upright position, leftwardly lying position and rightwardly lying position.

It is evident that, although the invention has been described by referring to a preferred embodiment, many changes and modifications may be made therein in working the invention by those who are skilled in the art in the mechanism of the recording section and keyboard section, the construction of the control circuits and the contents of the control programs, without departing from the scope of the invention.

What is claimed is:

1. A recording apparatus comprising:
   (a) a keyboard comprising a multiplicity of character and symbol keys corresponding to various kinds of characters and symbols, and a plurality of functional keys;
   (b) a paper feeding device for supporting a recording paper and feeding same in the usual direction and also the opposite direction;
   (c) a carriage for supporting writing instruments movable in a direction perpendicular to the direction in which the recording paper is fed;
   (d) A carriage drive means for driving the carriage;
   (e) a writing instrument drive means for driving each said writing instrument to bring same into and out of contact with the recording paper;
   (f) a character and symbol pattern memory for storing character symbol pattern data; and
   (g) a control unit operative for reading out, as said character and symbol key are actuated, the character and symbol pattern data corresponding to the actuated character and symbol keys and controlling the operation of the paper feeding device, carriage drive means and writing instrument drive means in accordance with the read-out character and symbol patten data;

wherein the improvement comprises:
   (h) a recorded posture command key located in the keyboard for giving instructions to the recording control unit as to whether the characters and symbols are to be recorded on the recording paper in an upright position or in a lying position;
   (i) a writing instrument position memory for storing the position in which the writing instrument is located on the recording paper when the recorded posture is switched from the upright position to the lying position by actuating the recorded posture command key; and
   (j) a writing instrument restoring means operative, when the recorded posture is switched from the lying position back to the upright position by actuating the recorded posture command key, to restore the writing instrument to the position on the recording paper which is stored in the writing instrument position memory.

2. A recording apparatus as claimed in claim 1, said recorded posture command key comprising a vector key 182 for selecting either an upright position recording mode or a lying position recording mode in accordance with the content of the recorded posture register.

* * * * *